(12) United States Patent
Watanabe et al.

(10) Patent No.: US 8,726,890 B2
(45) Date of Patent: May 20, 2014

(54) INTAKE AIR HEATING APPARATUS

(75) Inventors: Osamu Watanabe, Utsunomiya (JP); Ryouji Saiki, Utsunomiya (JP); Susumu Nakajima, Utsunomiya (JP); Minoru Arai, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 82 days.

(21) Appl. No.: 13/328,493

(22) Filed: Dec. 16, 2011

(65) Prior Publication Data
US 2012/0152213 A1 Jun. 21, 2012

(30) Foreign Application Priority Data
Dec. 21, 2010 (JP) .................................. 2010-284078

(51) Int. Cl.
*F02G 5/00* (2006.01)
(52) U.S. Cl.
USPC .................. 123/556; 123/179.18; 123/543
(58) Field of Classification Search
USPC .................. 123/556, 179.18, 540, 543
See application file for complete search history.

(56) References Cited

U.S. PATENT DOCUMENTS

| 7,128,035 B2* | 10/2006 | Lancaster et al. ......... 123/179.18 |
| 2003/0010022 A1* | 1/2003 | Suzuki ........................... 60/286 |
| 2008/0255752 A1* | 10/2008 | Sugihara ....................... 701/103 |

FOREIGN PATENT DOCUMENTS

JP 5209577 8/1993

OTHER PUBLICATIONS

Translated abstract of JP5209577 (see above) from Espacenet.com; accessed on Dec. 16, 2011.

* cited by examiner

*Primary Examiner* — Lindsay Low
*Assistant Examiner* — Omar Morales
(74) *Attorney, Agent, or Firm* — Clifford B Vaterlaus

(57) ABSTRACT

An intake air heating apparatus may include an air pump, an intake chamber, an air heater, and a delivery pipe associated with an intake manifold. When intake air is heated, a throttle valve may be closed, the air pump may be started, and electrical power may be supplied to the air heater. The air flowing from the intake chamber may be heated by the air heater. Thereafter, the air may flow from the delivery pipe into branch pipes and circulate to the intake chamber. At that time, since the throttle valve may be closed, and an intake valve or an exhaust valve of an engine may be closed, the heated air may not flow out and the air temperature in the intake manifold and the intake air heating apparatus may increase.

19 Claims, 4 Drawing Sheets

INTAKE AIR HEATING APPARATUS

CROSS REFERENCES TO RELATED APPLICATIONS

The present application claims priority under 35 U.S.C. §119 to Japanese Patent Application No. 2010-284078 filed in the Japan Patent Office on Dec. 21, 2010 entitled "Intake Air Heating Apparatus," the entire contents of which are incorporated herein by reference in their entirety.

BACKGROUND

1. Field of the Invention

The present disclosure relates to an intake air heating apparatus mounted in, for example, a mixed fuel engine vehicle and, in particular, to a technology for improving the cold startability.

2. Description of the Related Art

In recent years, in order to prevent depletion of fossil fuel (e.g., gasoline or light oil), flexible fuel vehicles (hereinafter simply referred to as "FFVs") that use blended fuel in which alternative fuel, such as ethanol or methanol, is mixed with gasoline in a predetermined proportion have been developed. Since alternative fuel having a high boiling point is negligibly changed to a gas phase at a low temperature (that is, the alternative fuel is in the form of droplets and it is difficult to be ignited), some FFVs heat intake air using an intake heater at a cold start time in order to heat the alternative fuel for vaporization.

SUMMARY

Techniques have been disclosed in which air is drawn from the upstream side of an intake manifold using an air supply unit. The air is heated using an intake heater and is supplied (injected) from the fuel injection side of a fuel injection valve. In this way, vaporization of the fuel is enhanced. However, in such techniques, only air drawn by the air supply unit is heated, and the entirety of intake air is not heated at a start time. Therefore, the cold startability needs to be improved.

Accordingly, one feature of the present disclosure provides an intake air heating apparatus having improved cold startability.

According to an embodiment of the disclosure, an intake air heating apparatus includes an intake air passage configured to connect a throttle valve to a cylinder head of a combustion engine, an air outlet unit formed in the intake air passage, an air inlet unit formed in the intake air passage at a position different from a position of the air outlet unit in a direction in which intake air flows, a circulation passage configured to allow the air outlet unit to communicate with the air inlet unit, an air supply unit disposed in the circulation passage, where the air supply unit delivers the air in the intake air passage from the air outlet unit to the air inlet unit, and an air heating unit disposed in the circulation passage, where the air heating unit heats the air flowing in the circulation passage. The air supply unit and the air heating unit are driven before the combustion engine is started. By heating air in an intake passage and a circulation passage to a sufficiently high temperature, high-temperature air flows into a combustion chamber during cranking and, therefore, vaporization of fuel is promoted. Thus, smooth start of an engine can be achieved.

In one embodiment of the present disclosure, when the air supply unit and the air heating unit are driven, the throttle valve can be closed. By closing a throttle valve during heating, heated air negligibly flows to the outside and, therefore, the heating time can be decreased.

The air outlet unit can be disposed upstream of the air inlet unit in the direction in which the intake air flows. By disposing the air outlet unit upstream of the air inlet unit, the heated air can be preferentially drawn into the combustion chamber.

The air outlet unit can be disposed downstream of the air inlet unit in the direction in which the intake air flows. By disposing the air outlet unit downstream of the air inlet unit, the airflow of intake air can be negligibly interrupted during a start-up.

DETAILED DESCRIPTION

Figure 1:
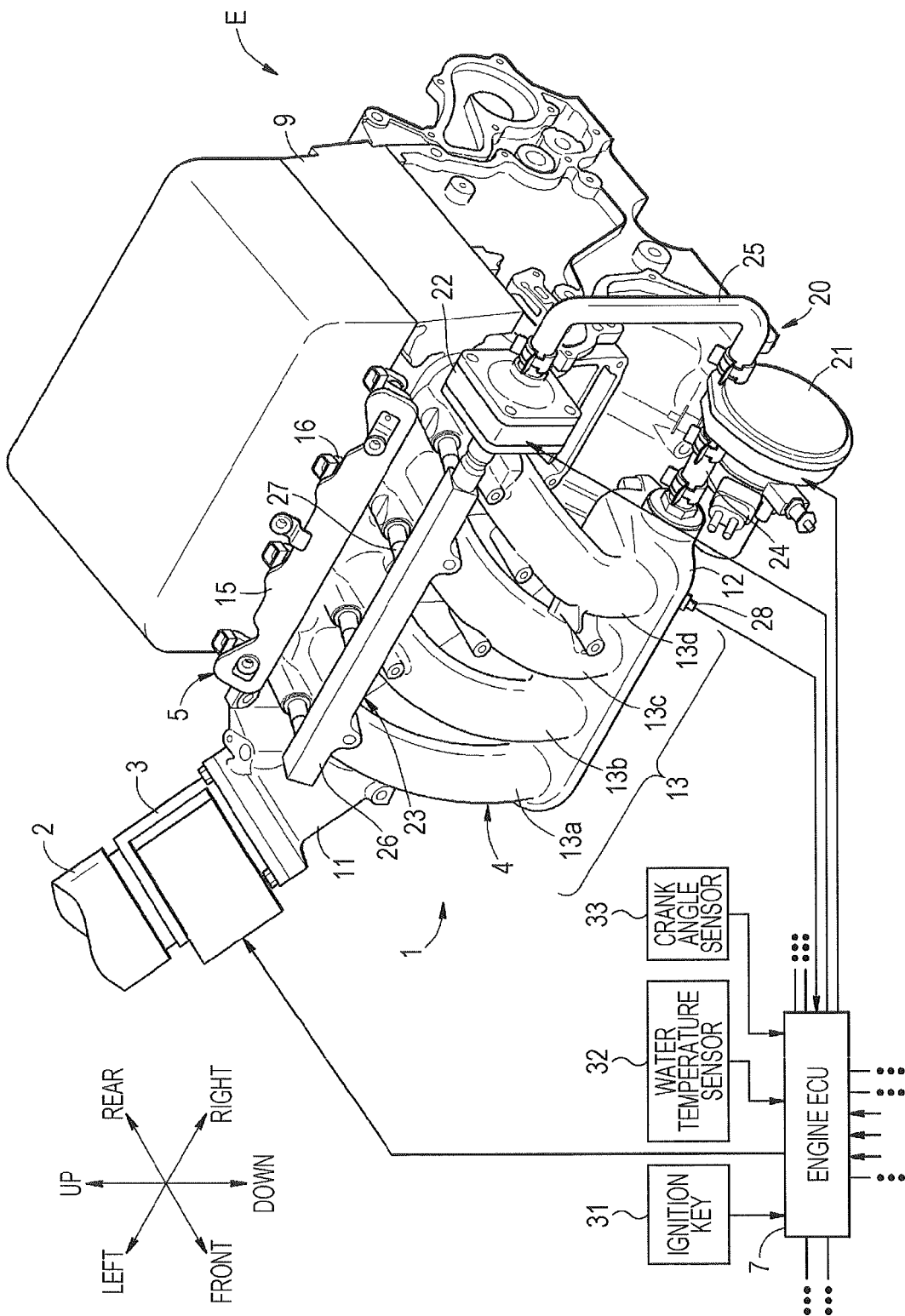
FIG. 1 is a perspective view of an air intake apparatus according to an embodiment.

An air intake apparatus of an in-line four-cylinder engine of an FFV according to an embodiment of the present disclosure is described in detail below with reference to the accompanying drawings. Note that FIG. 1 shows members of the in-line four-cylinder engine and up-down, left-right, and front-rear directions indicated by arrows. In the description below, the members are described using the positions and the directions indicated in FIG. 1. However, it will be appreciated that in alternative embodiments, the members may be arranged in different configurations within the scope of the present disclosure.

As shown in FIG. 1, according to one embodiment, an air intake apparatus 1 includes an electronically-controlled throttle valve 3 connected to an air cleaner (not shown) via an intake duct 2, an intake manifold 4 that connects the throttle valve 3 to the front surface (a surface adjacent to an intake side) of a cylinder head 9, and a fuel injection unit 5 located on the upper section of the intake manifold 4 at the downstream end (i.e., the upper section adjacent to a cylinder head 9). The throttle valve 3 is controlled and driven by an engine ECU 7 that performs overall control of an engine E.

The intake manifold 4 includes an air introduction tube 11 onto which the throttle valve 3 is fastened, an intake chamber 12 that communicates with the downstream portion of the air introduction tube 11, and branch pipes 13 (13a to 13d) that branch from the intake chamber 12 to air intake ports (not shown) of the cylinders. The fuel injection unit 5 includes a fuel rail 15 and four fuel injection valves 16. The top end of each of the fuel injection valves 16 is fitted together with the downstream end of one of the branch pipes 13 by insertion.

An intake air heating apparatus 20 includes an air pump 21 located on the right of the intake chamber 12, an air heater 22 located on the right front of the cylinder head 9, and a delivery pipe 23 located above the intake manifold 4. The air pump 21 is controlled and driven by the engine ECU 7. The air pump 21 sucks the air in the intake chamber 12 through a hose 24 and pumps the air into the air heater 22 via a U-shaped molded hose 25. The air heater 22 is formed from an electric heater (e.g., a ceramic heater) that is electrically controlled by the engine ECU 7. The air heater 22 heats the air supplied from the air pump 21.

The delivery pipe 23 includes a delivery pipe body 26 integrated into the air heater 22 and four air pipes 27 protruding from the rear section of the delivery pipe body 26. The top end of each of the air pipes 27 is fitted together with one of the branch pipes 13 of the intake manifold 4 in the vicinity of the fuel injection valve 16 on the upstream side. In addition, the intake chamber 12 includes an air temperature sensor 28 mounted thereon. The air temperature sensor 28 detects the temperature inside the intake chamber 12 (an air temperature Ta) and outputs the result of detection to the engine ECU 7. Note that the engine ECU 7 is connected to an ignition key 31, a water temperature sensor 32, and a crank angle sensor 33 in addition to the above-described throttle valve 3, air pump 21, air heater 22, and air temperature sensor 28.

Figure 2:
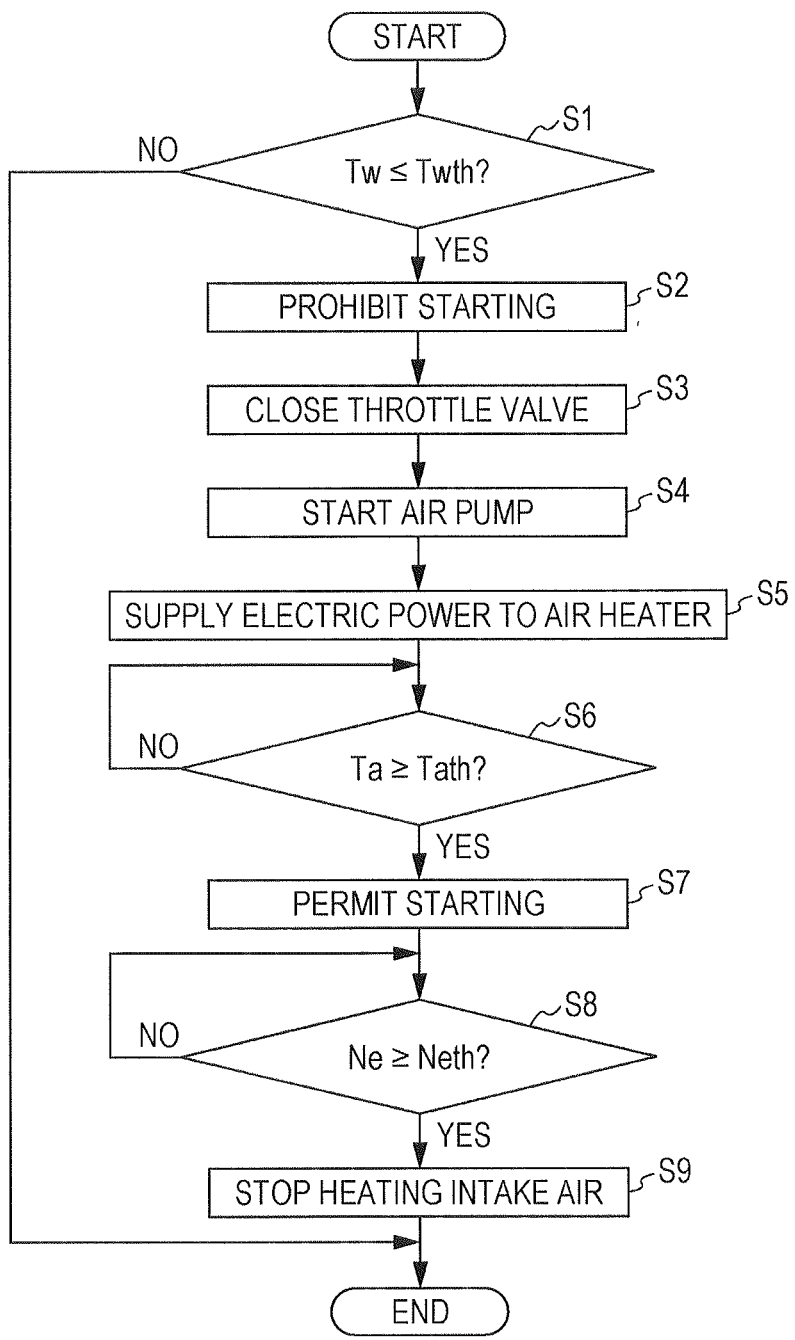
FIG. 2 is a flowchart illustrating a processing sequence of intake air heating control according to the embodiment.

When a driver turns on the ignition key 31, the engine ECU 7 repeatedly performs air intake heating control indicated by the flowchart shown in FIG. 2 at predetermined intervals. After starting the air intake heating control, the engine ECU 7, in step S1 shown in FIG. 2, determines whether a water temperature Tw is lower than or equal to a predetermined threshold value Twth (e.g., 50°). If the determination is "No", the processing directly returns to the start point. In such a case, since the temperature of the engine E is high and, therefore, the fuel is sufficiently vaporized (so that any problem of starting an engine does not arise), waste power consumption for driving the intake air heating apparatus 20 can be prevented.

After the vehicle has been parked for a long time, if, in step S1, the determination is "Yes", the engine ECU 7, in step S2, does not allow the engine E to start. In this way, even when the driver turns the ignition key 31 to start the engine E, a starter motor and the fuel injection valves 16 do not operate. Thus, complete discharge of a battery (a dead battery) rarely occurs. In addition, deposition of droplets on the inner wall of the intake manifold 4 or a spark plug (not shown) is prevented. Note that at that time, for example, a message such as "Please wait a while" may be displayed on an instrument panel.

Figure 3:
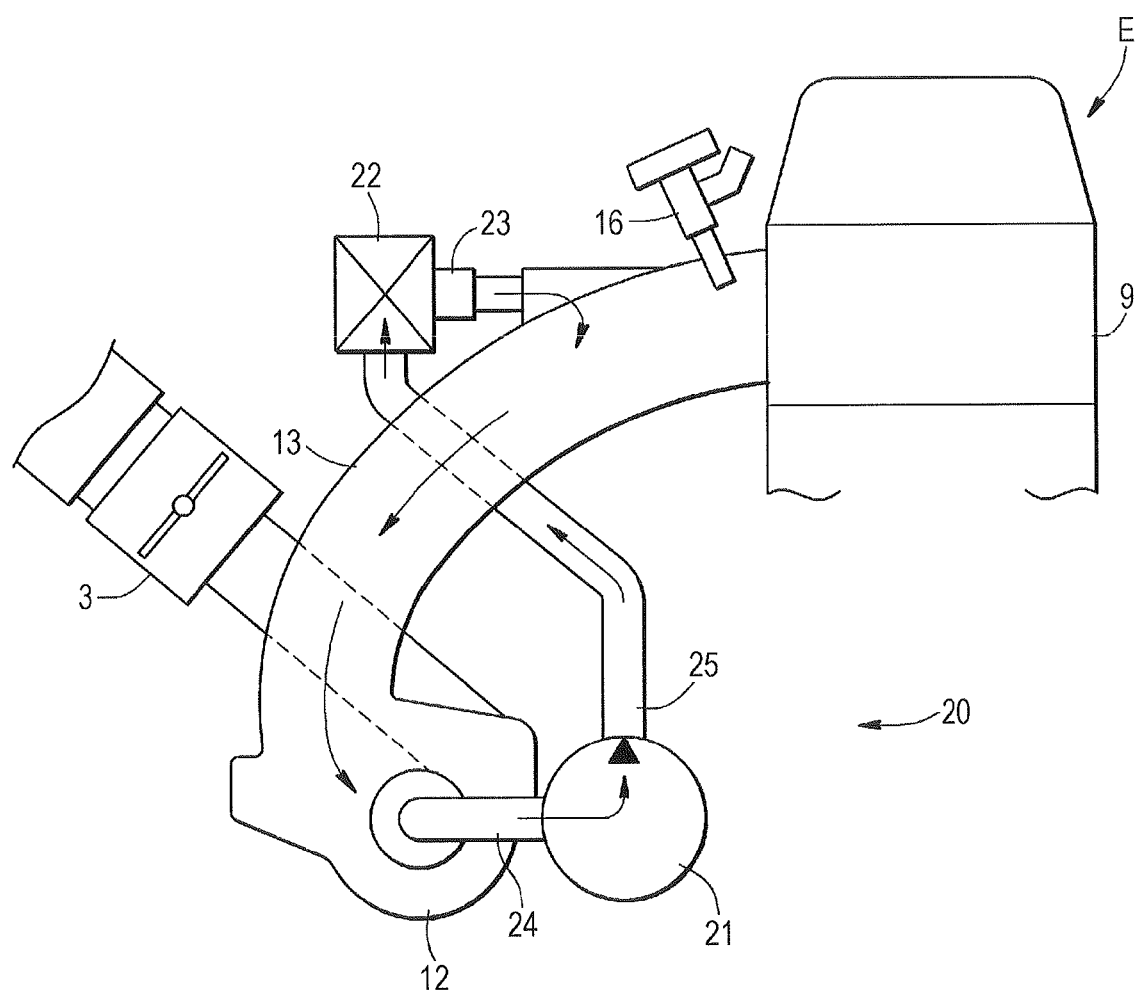
FIG. 3 is a schematic illustration of the operation of the embodiment.

Subsequently, in step S3, the engine ECU 7 closes the throttle valve 3. In step S4, the engine ECU 7 starts the air pump 21. In step S5, the engine ECU 7 supplies electrical power to the air heater 22. In this way, as shown in FIG. 3, the air supplied from the intake chamber 12 is heated by the air heater 22 and, thereafter, flows from the delivery pipe 23 into the branch pipes 13. Subsequently, the air circulates to the intake chamber 12. At that time, the throttle valve 3 is closed, and one of an intake valve and an exhaust valve in the engine E is closed. A closed air flow path may thereby be formed as shown by the arrows in FIG. 3. Accordingly, heat loss due to outflow of the heated air can be prevented. Thus, the air temperature Ta inside the intake manifold 4 and the intake air heating apparatus 20 rapidly rises.

Subsequently, in step S6, the engine ECU 7 determines whether the air temperature Ta reaches a predetermined threshold value Tath (e.g., 100°). If the determination is "No", the engine ECU 7 repeats the determination in step S6 until the determination becomes "Yes".

If the air temperature Ta reaches the threshold value Tath and, therefore, the determination in step S6 becomes "Yes", the engine ECU 7, in step S7, allows the engine E to start (i.e., the driver can start the engine E). Note that at that time, for example, a message such as "You can start the engine" may be displayed on an instrument panel.

Subsequently, in step S8, the engine ECU 7 determines whether the engine E is started and the engine rotating speed Ne reaches a predetermined threshold value Neth (e.g., 500 rpm). If the determination is "No", the engine ECU 7 repeats the determination in step S8 until the determination becomes "Yes".

If, in step S8, the engine rotating speed Ne reaches the predetermined threshold value Neth and, therefore, the determination becomes "Yes", the engine ECU 7, in step S9, stops heating the intake air (i.e., stops driving the air pump 21 and supplying electric power to the air heater 22). Thus, the engine ECU 7 stops the intake air heating control.

In this way, when the driver turns the ignition key 31 to start the engine E, heated air is delivered from the intake manifold 4 into combustion chambers of the engine E. Since the fuel injected from the fuel injection valves 16 is effectively vaporized, the engine E can be started in an efficient manner. Note that according to the present embodiment, since the heated air flows into the downstream end of the branch pipes 13, the heated air can preferentially flow into the combustion chambers.

Figure 4:
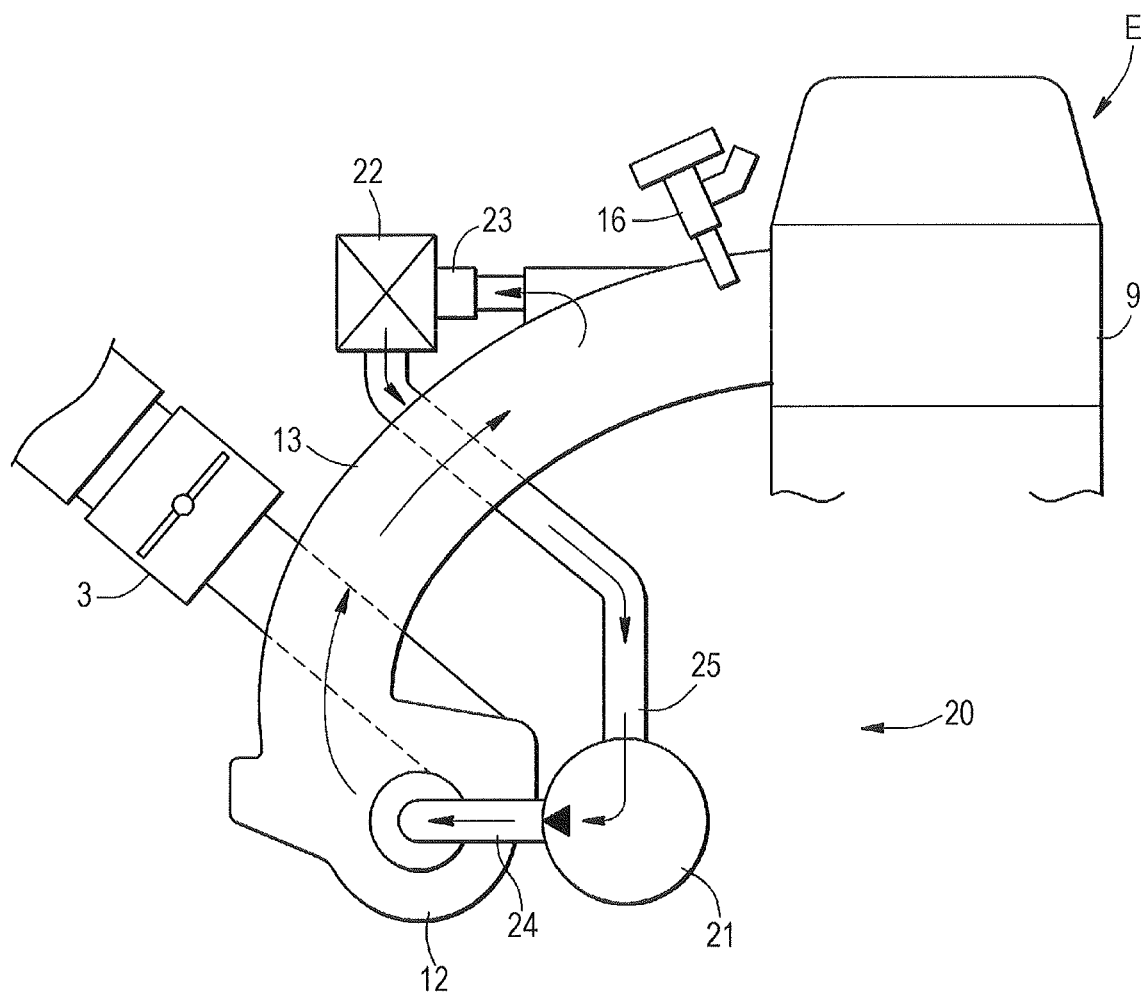
FIG. 4 is a schematic illustration of the operation of a partial modification.

The structure of a partial modification is substantially the same as that of the above-described embodiment. However, as shown in FIG. 4, only the flow direction of the air inside the intake manifold 4 and the intake air heating apparatus 20 differs from that in the previous embodiment. That is, in the partial modification, the ejecting direction of the air pump 21 is opposite to that in the previous embodiment. The air drawn from the branch pipes 13 via the delivery pipe 23 is heated by the air heater 22. Thereafter, the air flows into the intake chamber 12 and circulates to the branch pipes 13. The operation of the partial modification is similar to that of the previous embodiment. Note that in the partial modification, since, during heating, the air flows from the intake chamber 12 to the branch pipes 13, the flow of intake air is negligibly interrupted at a startup time.

While the present disclosure has been described with reference to the embodiment and the partial modification discussed above, embodiments of the disclosure are not limited thereto. For example, while the above embodiment has been described with reference to an air intake apparatus for an FFV engine, the present disclosure is applicable to an air intake apparatus for other engines, such as a diesel engine. In addition, while the above embodiment has been described with reference to the case in which only the throttle valve is closed during heating of intake air, the intake valve may be additionally closed by using a variable valving mechanism. Alternatively, if a mechanically driven throttle valve is employed, the throttle valve may not be closed during heating of intake air. Furthermore, while the above embodiment has been described with reference to the intake air heating apparatus connected to the intake chamber and the branch pipes, the intake air heating apparatus may be connected to the air introduction tube and the intake chamber (or the branch pipes). Still furthermore, while the above embodiment has been described with reference to stoppage of air heating after starting the engine, heating of the air may continue until a warming-up time ends. Alternatively, heating of the air may be stopped when heating of the intake air is completed. In addition, it should be noted that the configuration and layout of the intake air heating apparatus and the control sequence of the intake air heating apparatus can be changed as needed within the spirit and scope of the appended claims.

What is claimed is:

1. An intake air heating apparatus comprising:
an intake air passage configured to connect a throttle valve to a cylinder head of a combustion engine;
an air outlet unit formed in the intake air passage;

an air inlet unit formed in the intake air passage at a position different from a position of the air outlet unit in a direction in which intake air flows;

a circulation passage configured to allow the air outlet unit to communicate with the air inlet unit, the circulation passage being disposed downstream of the throttle valve in the direction in which the intake air flows;

an air supply unit disposed in the circulation passage, the air supply unit delivering the air in the intake air passage from the air outlet unit to the air inlet unit;

an air heating unit disposed in the circulation passage, the air heating unit heating the air flowing in the circulation passage; and a controller that drives the air supply unit and the air heating unit before the combustion engine is started.

2. The intake air heating apparatus according to claim 1, wherein when the air supply unit and the air heating unit are driven, the throttle valve is closed, and the intake air passage and the circulation passage form a closed airflow path defining a continuous loop.

3. The intake air heating apparatus according to claim 1, wherein the air outlet unit is disposed upstream of the air inlet unit in the direction in which the intake air flows.

4. The intake air heating apparatus according to claim 1, wherein the air outlet unit is disposed downstream of the air inlet unit in the direction in which the intake air flows.

5. An intake air heating apparatus comprising:
an intake air passage configured to connect a throttle valve to a cylinder head of a combustion engine;
a circulation passage configured to allow air to circulate in the intake air passage, the circulation passage being disposed downstream of the throttle valve in the direction in which the intake air flows;
an air pump for pumping air in the circulation passage;
an air heater for heating air; and
means for controlling the air pump and the air heater to heat air in the intake air passage before allowing the combustion engine to start.

6. The intake air heating apparatus according to claim 5, wherein the intake air passage comprises an intake manifold.

7. The intake air heating apparatus according to claim 5, wherein the means for controlling is connected to an ignition key to control starting of the combustion engine.

8. The intake air heating apparatus according to claim 5, wherein the means for controlling controls the throttle valve to close the throttle valve and allow intake air to circulate in the intake air passage.

9. The intake air heating apparatus according to claim 8, wherein the intake air passage and the circulation passage define a closed airflow path when the throttle valve is closed to prevent outflow of heated air until the air in the intake passage reaches a threshold temperature.

10. The intake air heating apparatus according to claim 5, further comprising an air temperature sensor for detecting the temperature inside the intake air passage.

11. The intake air heating apparatus according to claim 10, further comprising a water temperature sensor connected to the means for controlling, wherein when a water temperature of the combustion engine is lower than or equal to a threshold value, the combustion engine is not allowed to start until the air inside the intake air passage reaches a threshold temperature.

12. The intake air heating apparatus according to claim 5, wherein the intake air passage comprises an intake chamber having a plurality of branch pipes, and wherein the circulation passage is connected to the intake chamber.

13. The intake air heating apparatus according to claim 12, wherein the circulation passage comprises a hose and a delivery pipe having a plurality of air pipes, and wherein each of the plurality of air pipes is connected to a different one of the plurality of branch pipes.

14. The intake air heating apparatus according to claim 5, wherein the air pump and the air heater are disposed in the circulation passage.

15. The intake air heating apparatus according to claim 5, further comprising a sensor for detecting a rotating speed of the combustion engine, the sensor being connected to the means for controlling such that when the rotating speed reaches a threshold value, the air pump and the air heater are stopped.

16. An intake air heating method for use in an intake air passage that connects a throttle valve to a cylinder head of a combustion engine, the method comprising:
circulating heated air through the intake air passage;
closing the throttle valve to form a closed airflow path defining a continuous loop in the intake air passage and a circulation passage connected to the intake air passage; and
preventing the combustion engine from starting until the air in the intake air passage reaches a threshold temperature.

17. The intake air heating method according to claim 16, further comprising:
determining a water temperature of the combustion engine; and
heating the intake air if the water temperature is at or below a threshold value.

18. The intake air heating method according to claim 16, further comprising:
determining a rotating speed of the combustion engine.

19. The intake air heating method according to claim 18, further comprising:
stopping heating of the intake air when the rotating speed reaches a threshold value.

* * * * *